(No Model.) 2 Sheets—Sheet 1.

L. P. CONKLIN.
APPARATUS FOR FEEDING SHAVINGS TO STEAM BOILER AND OTHER FURNACES.

No. 266,973. Patented Nov. 7, 1882.

Witnesses:
O. F. Malmborg
Thomas E. Crossman

Inventor
Lewis P. Conklin
by James A. Whitney
Attorney.

(No Model.) 2 Sheets—Sheet 2.

L. P. CONKLIN.
APPARATUS FOR FEEDING SHAVINGS TO STEAM BOILER AND OTHER FURNACES.

No. 266,973. Patented Nov. 7, 1882.

Witnesses:
O. F. Malmborg.
Thomas E. Crossman

Inventor:
Lewis P. Conklin
by James A. Whitney
Attorney.

UNITED STATES PATENT OFFICE.

LEWIS P. CONKLIN, OF GREEN POINT, NEW YORK.

APPARATUS FOR FEEDING SHAVINGS TO STEAM-BOILER AND OTHER FURNACES.

SPECIFICATION forming part of Letters Patent No. 266,973, dated November 7, 1882.

Application filed June 16, 1882. (No model.)

*To all whom it may concern:*

Be it known that I, LEWIS P. CONKLIN, of Green Point, in the county of Kings and State of New York, have invented certain Improvements in Apparatus for Feeding Shavings to Steam-Boiler and other Furnaces, of which the following is a specification.

This invention relates to that class of apparatus which automatically convey the shavings from planing-machines and from similar wood-working apparatuses directly to a furnace, where they may be consumed as fuel, preferably for generating steam to drive the machinery by which the planing or other mechanism is operated.

The said invention comprises certain novel combinations of parts, whereby the practical utility of this class of apparatus is very materially increased.

Figure 1:
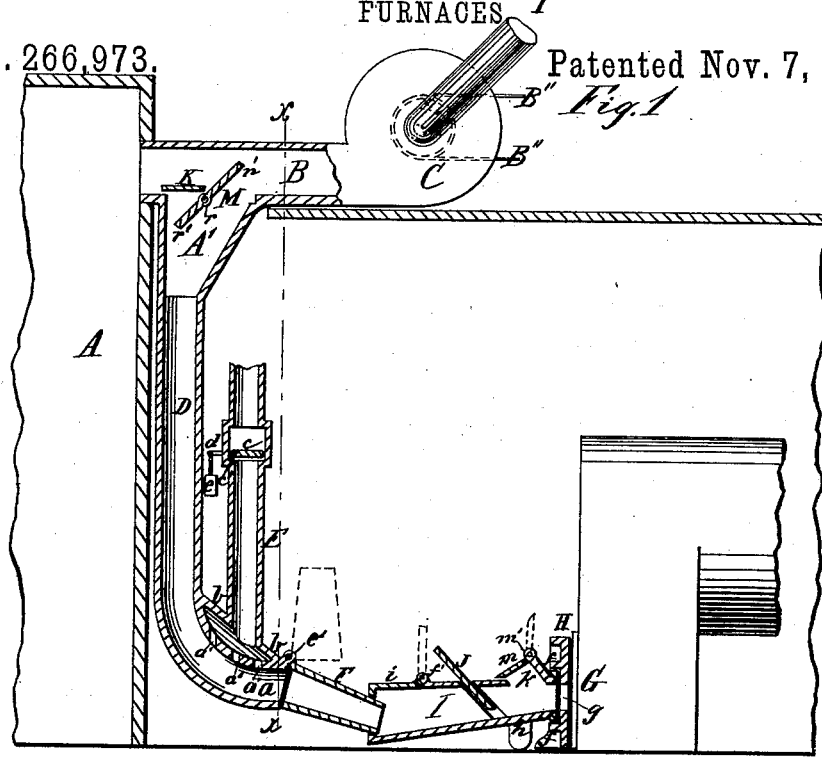
Figure 2:
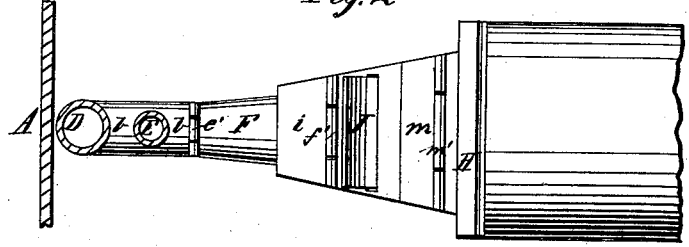
Figure 3:
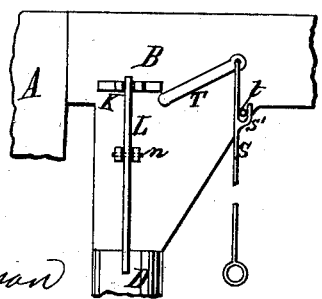
Figure 4:
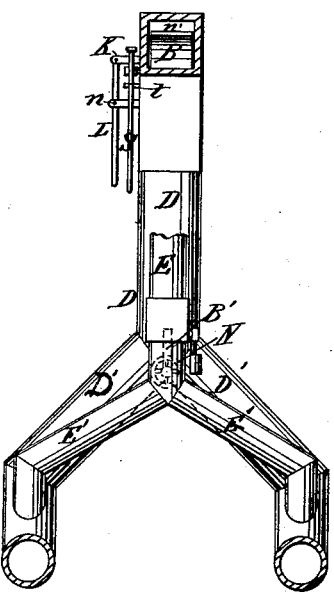
Figure 5:
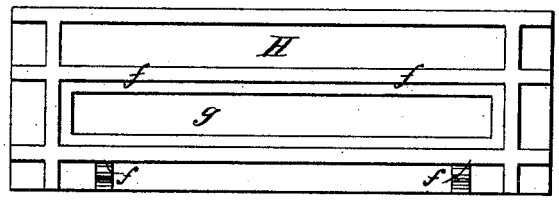

Figure 1 is a side view and partial vertical longitudinal sectional view of an apparatus constructed according to my said invention. Fig. 2 is a plan view and partial horizontal sectional view of the same. Fig. 3 is a detail view from the side of certain parts embraced in said apparatus. Fig. 4 is a vertical transverse sectional view, taken as in the line $x\ x$ of Fig. 1, and representing that feature of my said invention which relates to supplying two or more furnaces simultaneously from the same source of supply; and Fig. 5 is a detail view, on a larger scale, of one of the parts included in said apparatus.

A is a receiving room or chamber, such, for example, as is very commonly used for receiving the shavings from the planing machine or other apparatus by which the shavings are produced, and B is the pipe which connects said chamber or room with the machine, the said pipe being provided with a fan-blower, C, to rush therethrough a current of air, which blows or conducts the shavings from the machine through the said pipe B into the room A. These parts, except as hereinafter explained, being of ordinary construction and arrangement, need here no specific description.

The inner end of the pipe B is connected with a vertical pipe, D, a triangular chamber, A', being formed at the intersection of the pipe B with the pipe D. The pipe D has its lower end curved to a horizontal position, as shown at $a$, the inner side of the bend being, moreover, provided with a number of perforations, $a'$. Above these perforations is a shell, $b$, from which rises a pipe, E. In this pipe E is a valve, $c$, to the pivot $c'$ of which, outside of the pipe E, is attached an arm or lever, $d$, to which is attached a weight, $e$, which serves as a counter-balance within due limits to the valve $c$.

Attached to the horizontal lower end of the pipe D is a hood, F, pivoted at its upper inner edge to the end of the said pipe, as shown at $e'$. The inner end of the said hood F is of a shape and size corresponding to the adjacent end of the pipe D, while the outer end of said hood F is flattened and broadened so as to be narrower, measured vertically, and wider, measured horizontally, and of such proportions as to have a smaller available cross-section or outlet-area to the blast at that place to drive the shavings with a forcible impact against the inclined surface of the hood in such manner as to horizontally scatter the shavings preliminary to their entrance to the fire-box.

G is the fire-box or furnace into which the shavings are to be thrown for combustion. This may be of any ordinary or suitable construction, except that placed externally at its front is a plate, H, which is not bolted or otherwise rigidly attached to the said front of the said fire-box, but is placed upon any suitable support. This plate may therefore be readily removed, on occasion, to permit the temporary disuse of the apparatus when—as, for instance, for lack of shavings—it is desired to supply the fire-box with other fuel, after the manner of an ordinary furnace. A rim, $f$, which forms a circumferential flange which receives or passes around the adjacent end of a horizontal chamber, I, is interposed between the hood F and the plate H, there being a central opening, $g$, in the latter of a size and shape proportioned to that of the adjacent end of the chamber I, and constituting the passage through which the shavings pass from the said chamber into the fire-box. This chamber is of peculiar construction, and may, on occasion, be removed bodily from its position. It may be supported by any suitable means—as, for example, upon legs $h$. Its inner end—that is to say, the end adjacent to the hood F—is of a shape and size sufficient to permit the entrance of the outer end of said hood. In order that this may be done, the chamber I is provided at the upper part of its inner end with a hinged leaf or cover, i, the hinge or pivot of which is shown at f'. By throwing up this plate or cover i the hood F may be turned around its pivot e, thereby entirely disconnecting it from communication with the fire-box. Working through a slot in the top of the chamber I, and in suitable guides provided internally in the sides thereof, is a slide, J, which may be pulled out to afford greater available egress-space to the chamber I, or pushed in to diminish such space, one special function of this slide J being to regulate the volume of air to be admitted to the fire-box simultaneously with the admission of the shavings. The said chamber I, in its top and adjacent to the fire-box, is provided with an opening, k, over which is placed a lid or cover, m, hinged as represented at m'.

That end of the pipe B adjacent to the room A is provided with a horizontal slide, K, which works through one side of said pipe, as indicated in Fig. 3, and which may be moved in or out by a suitable lever, L, attached to its outer end, and pivoted as shown at n in Fig. 3.

At the lower part of the same portion of the pipe B—that is to say, at the top of the chamber A'—is a butterfly-valve, M, the pivot or shaft r of which is below the adjacent edge of the laterally-movable slide K, as shown in Fig. 1. The upper part, n', of this valve M is so arranged that the adjustment of the valve, as presently herein set forth, adjusts the available opening of the pipe B at its juncture with the room A, while the lower portion, r, of the said valve M is so adjusted as to more or less regulate the width of the available passage from the pipe B downward to the pipe D, apart from the regulation of the available cross-section of said passage effected by the valve K.

The shaft or stem r of the valve M projects through one side of the chamber A', and has to its thus projecting end an arm or lever, T, to the end of which is attached an operating-rod, s, as shown in Fig. 3. This rod is provided with an upwardly-projecting hook, s', which, acting against a stud, t, limits the upward sweep of the part n' of the valve M. The parts n and n' of the said valve are so balanced, proportioned, and arranged that when the said valve is adjusted to any required position, as hereinbefore explained, the blast from the fan C, bearing against the said valve, automatically retains it in the required position, as just set forth, by the action of the hook s' when caught upon the stud t.

In the operation of the apparatus, the fan-blast, being thrown through the pipe B, carries the shavings into and through the same. The said shavings having been introduced to the fan-blower C through the inlet-tube or conduit P from the source of supply—as, for example, the vicinity of a planing-machine or like mechanism—and passing from the said fan-blower to the said pipe B, the upper part of the valve M being lifted, as aforesaid, by the blast, catches the shavings, which by their own weight are caused as they travel to pass along the lowermost part of the pipe B, and are thus intercepted by the upper part, n', of the valve M and directed downward through the pipe D, and thence through the hood F, chamber I, and opening g of the plate H into the fire-box, the shavings for fuel and the requisite volume of air to support combustion being thus simultaneously supplied to the said fire-box; but, inasmuch as the volume of air is ordinarily very much greater than is desirable for purposes of combustion, the surplus is permitted to escape. This it will do automatically by regurgitation through the pipe E, the escaping surplus air lifting the balance-valve c, the latter closing as soon as the air-pressure falls below that required to supply the normal or requisite quantity of air to the furnace. In exceptional instances, where this means of providing for the escape of the surplus air is insufficient, the slide K is moved outward to provide a space above the part r' of the valve M, whereupon a portion of the air by back-pressure passes behind the part r' of the said valve, and thence upward through the space afforded by the withdrawal to a greater or less extent of the slide K, as just explained, and thence makes its exit into the chamber A.

Of course, by limiting the height to which the part n' of the valve M may rise, as hereinbefore explained, any surplus of the shavings carried through the pipe B may be permitted to pass over the said valve into the said room A. In practice there frequently arise cases where the supply of shavings to the pipe B is insufficient to maintain the requisite degree of combustion, and in such case the lid m is raised and the fire-box is fed direct from the opening k of the chamber I with any additional quantity of shavings or with other fuel.

It is to be observed that the chamber I is highest and narrowest at the end adjacent to the hood F and broadest and lowest at the end adjacent to the fire-box G, and with a cross-section of greater area, the object of this being to provide sufficient room for the exit of the shavings from the chamber I into the fire-box, and to insure the uniform spreading of the mass of shavings over the flame-surface of the fire-box, to insure there most speedy and complete combustion.

The apparatus may be applied to supply shavings automatically to two or more furnaces, instead of one alone. For this purpose I employ the combination of parts represented in Fig. 4. In this the pipe D is bifurcated at its lower end, as shown at B', each of the branch pipes D' being provided with its own hood and each connected with its own chamber, I, for communication with the separate fire-boxes.

The pipe E is in like manner bifurcated, as represented at E′, each branch pipe E′ communicating with one of the branch pipes D′.

At the intersection of the branch pipes D′ with the pipe D is provided a valve, N, which may be operated by a hand-wheel placed at the outwardly-projecting end of its stem, and which is so arranged that it may be turned to close one or the other of the said branch pipes D′, or adjust them so as to equally divide the downward-flowing current of air and shavings from the pipe D between the said two branch pipes, in order that they may pass in substantially equal quantities to the several fire-boxes.

What I claim as my invention is—

1. The combination of the chamber I, constructed with the plate or cover $i$, the opening $k$, and lid or cover $m$, and having the slide J, the fire-box G, the hood F, pivoted to the lower part of the pipe D, the said pipe D, the pipe E, connected therewith and having the valve $c$, the blast-pipe B, and a valve, M, arranged in relation with the said pipe B and the pipe D, the whole constructed and combined for joint use and operation substantially as and for the purpose herein set forth.

2. The combination of the pipe D, constructed with the openings $a'$ at the inner side of its bend, the shell $b$, placed over the said openings, the escape-pipe E, having the valve $c$, and its lower end opening through the shell $b$, the blast-pipe B, and valve M, arranged to control the passage of air and shavings from the said blast-pipe to the said pipe D, and means substantially as described, for transmitting air and shavings from the said pipe D to the fire-box G, all substantially as and for the purpose herein set forth.

3. The combination of the plate H, constructed with the flange $f$ and attached to the front of the fire-box G, the chamber I, constructed with the slide J, the opening $k$, and lid or cover $m$, the pipe D, the blast-pipe B, the valve M for directing the current of shavings and air from the said blast-pipe to the pipe D, and means, substantially as described, for transmitting the said current from the lower end of the pipe D to the chamber I, all substantially as and for the purpose herein set forth.

4. The combination of the laterally-movable slide K with the blast-pipe B, the pipe D, the valve M, arranged to direct the current of air and shavings from the pipe B to the pipe D, and means, substantially as described, for transmitting said current from the lower end of the pipe D to the fire-box G, all substantially as and for the purpose herein set forth.

LEWIS P. CONKLIN.

Witnesses:
THOMAS E. CROSSMAN,
CHAS. P. BLINN.